(12) United States Patent
Miles et al.

(10) Patent No.: US 9,939,549 B2
(45) Date of Patent: Apr. 10, 2018

(54) MEASUREMENT OF FORMATION BULK DENSITY EMPLOYING FORWARD MODELING OF NEUTRON-INDUCED GAMMA-RAY EMISSION

(71) Applicant: SCHLUMBERGER TECHNOLOGY CORPORATION, Sugar Land, TX (US)

(72) Inventors: Jeffrey Miles, Cambridge, MA (US); Mathilde Luycx, Austin, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 14/960,429

(22) Filed: Dec. 6, 2015

(65) Prior Publication Data
US 2017/0160425 A1    Jun. 8, 2017

(51) Int. Cl.
*G01V 5/00* (2006.01)
*G01V 99/00* (2009.01)

(52) U.S. Cl.
CPC .............. *G01V 5/00* (2013.01); *G01V 99/005* (2013.01)

(58) Field of Classification Search
CPC ....................................................... G01V 5/00
See application file for complete search history.

(56) References Cited

U.S. PATENT DOCUMENTS

| | | | |
|---|---|---|---|
| 4,570,067 A | 2/1986 | Gadeken | |
| 4,816,674 A | 3/1989 | Ellis et al. | |
| 5,293,410 A | 3/1994 | Chen et al. | |
| 5,334,833 A * | 8/1994 | Case | G01V 5/12 250/269.1 |
| 5,377,105 A | 12/1994 | Smith | |
| 5,699,246 A | 12/1997 | Plasek et al. | |
| 6,285,026 B1 | 9/2001 | Evans et al. | |
| 7,112,783 B2 | 9/2006 | Ellis et al. | |
| 7,408,150 B1 * | 8/2008 | Flaum | G01V 5/125 250/269.6 |
| 9,568,639 B2 | 2/2017 | Grau et al. | |
| 9,575,208 B2 | 2/2017 | Grau et al. | |
| 2004/0104821 A1 | 6/2004 | Clark | |
| 2009/0045328 A1 | 2/2009 | Fricke et al. | |
| 2010/0004867 A1 * | 1/2010 | Zhou et al. | 702/8 |
| 2011/0191030 A1 * | 8/2011 | Roberts | 702/8 |

(Continued)

FOREIGN PATENT DOCUMENTS

GB       2298918 A     9/1996
WO   WO2009026061 A2   2/2009

OTHER PUBLICATIONS

First Office Action and Search Report issued in CN Application No. 201280036556.5 dated Dec. 23, 2015, with English translation by Agent (17 pages).

(Continued)

*Primary Examiner* — David Porta
*Assistant Examiner* — Hugh H Maupin

(57) ABSTRACT

A method and system for determining at least one property of a geological formation employs at least one forward model to derive at least one synthetic detector measurement that relates to neutron-induced gamma-ray emission from geological formation. The forward model is also used to infer at least one property of the geological formation including bulk density of the geological formation.

24 Claims, 12 Drawing Sheets

(56) References Cited

U.S. PATENT DOCUMENTS

2014/0088877 A1 3/2014 Ellis et al.
2016/0349398 A1 12/2016 Zhou et al.

OTHER PUBLICATIONS

Second Office Action and Search Report issued in CN Application No. 201280036556.5 dated Aug. 16, 2016, with English translation by Agent (22 pages).
Office Action issued in Mexican Patent application MX/a/2013/013612 dated Feb. 3, 2015. No. translation available. 3 pages.
Office Action issued in U.S. Patent application 14/119,181 dated Mar. 1, 2016. 13 pages.
Final Office Action issued in U.S. Patent application 14/119,181 dated Aug. 1, 2016. 21 pages.
Office Action issued in U.S. Patent application 14/119,181 dated Jan. 31, 2017. 14 pages.
Final Office Action issued in U.S. Patent application 14/119,181 dated Sep. 28, 2017. 18 pages.
International Search Report and Written Opinion issued in International Patent application PCT/US2012/039167 dated Dec. 6, 2012. 13 pages.
International Preliminary Report on Patentability issued in International Patent application PCT/US2012/039167 dated Nov. 26,2013. 7 pages.
Dworak, et al., "Numerical modeling of the gamma-gamma density tool responses in horizontal wells with an axial asymmetry", Jan. 1, 2011, Applied Radiation and Isotopes, vol. 69, No. 1, pp. 268-274.
Ellis, et al., "The Effect of Formation Absorption on the Thermal Neutron Porosity Measurement", 1987, 62nd SPE Annual Technical Conference and Exhibition, Dallas, TX, SPE Paper 16814-MS, 16 pages.
Mendoza, et al., "Linear iterative refinement method for the rapid simulation of borehole nuclear measurements", Jan. 2010, Society of Exploration Geophysicists, vol. 75, Issue 1, pp. E9-E29.
Mendoza, et al., "Linear iterative refinement method for the rapid simulation of borehole nuclear measurements: Part 2—High-angle and horizontal wells", Mar. 1, 2010, Society of the Exploration Geophysicists, Geophysics, vol. 75, No. 2, pp. E79-E90.
Mendoza et al., "Rapid Simulation of Borehole Nuclear Measurements with Approximate Spatial Flux-Scattering Functions," Symposium of the Society of Petrophysicists and Well-Log Analysts, 2007.
Smith, M. P., Neutron Absorption Effects on Dual-Spaced Thermal Neutron Logging Tools, Jun. 29-Jul. 2, 1987, SPWLA Twenty-Eight Annual Logging Symposium, 18 pp.
Watson, "A Spatial Sensitivity Analysis Technique for Neutron and Gamm-Ray Measurements", 1992, Trans. Am. Nucl. Soc., vol. 65, No. 1, pp. 3-4.
Watson, "Monte Carlo Computation of Differential Sensitivity Functions", 1984, Trans. Am. Nucl. Soc., vol. 46, pp. 655-657.
Zhou et al., "A Second-Order Fast-Forward Model for a Gamma-Gamma Density Logging Tool," SPE 124193, SPE Annual Technical Conference and Exhibition, New Orleans, LA, USA, 2009.

* cited by examiner

MEASUREMENT OF FORMATION BULK DENSITY EMPLOYING FORWARD MODELING OF NEUTRON-INDUCED GAMMA-RAY EMISSION

BACKGROUND

The present application relates to measurements of formation properties based on detection and analysis of neutron-induced gamma-ray emission and/or neutrons in the formation.

Forward modeling is useful for interpretation of measurements in non-trivial downhole logging geometries such as:
  high-angle/horizontal wells through formation layer transitions;
  thinly bedded formations,
  intermediate invasion, and
  various combinations of the above.

These geometries share a common feature that a measurement's zone of sensitivity can encompass regions with different properties, causing the overall measurement at a single point to be an unknown combination of the constituent regions.

For downhole nuclear logging measurements, the Monte Carlo method of modeling is typically used due to its accuracy. However, the Monte Carlo method of modeling is computationally intensive, making it unsuitable for fast modeling and interpretation of measurements in the non-trivial downhole logging geometries described above.

Forward models have been developed for several downhole nuclear measurements, including the gamma-gamma density, neutron porosity, and thermal neutron cross section (Sigma) measurements. Such forward models can be less accurate or physically complete than a full Monte Carlo simulation, but are typically much less computationally intensive and much faster to run, particularly for measurements in the non-trivial downhole logging geometries described above. However, forward models have not been developed for the measurement of formation density based on detection of neutron-induced gamma-rays from the formation.

SUMMARY

A method and system is provided that employs at least one forward model to derive at least one synthetic detector measurement that relates to neutron-induced gamma-ray emission from a geological formation or the return signal of neutrons from a geological formation. The forward model is used to interpret or infer at least one property of the geological formation including bulk density of the geological formation. The neutron-induced gamma-ray emission can result from inelastic interaction of neutrons with the geological formation.

The method and system can emit neutrons into the geological formation in order to induce gamma-ray emission from the geological formation and derive at least one actual detector measurement that relates to the neutron-induced gamma-ray emission from the geological formation. In some examples, the actual detector measurements further include direct measurement of neutrons from the formation resulting from the emission of neutrons into the formation. One or more synthetic detector measurements can be compared to corresponding one or more actual detector measurements in order to measure the at least one property (including bulk density) of the geological formation.

In some embodiments, the method and system can tune the at least one forward model based one or more iterations of an inversion process that matches one or more synthetic detector measurements to corresponding one or more actual detector measurements. The at least one forward model that results from the tuning can be used to measure the at least one property (including bulk density) of the geological formation.

The method and system can store the at least one property (including bulk density) of the geological formation in computer memory for subsequent analysis. The method and system can also control drilling of a well in the geological formation based on the at least one property (including bulk density) of the geological formation.

In some embodiments, the forward model includes a characteristic formation parameter defined by a linear or non-linear combination of more fundamental nuclear properties of the geological formation. The use of a combined formation parameter is valuable because it can be constructed to have a unique predictive relationship with each detector measurement, unlike the non-unique relationship between many individual formation properties and the detector measurement. In one example, the characteristic formation parameter is a functional combination of more fundamental nuclear properties of the form $$F_p = c_1 \cdot \Sigma_{absorption}^{c_2} + c_3 \cdot \rho_b^{c_4} + c_5 \cdot \Sigma_{elastic}^{c_6} + c_7 \cdot L_s^{c_8} + c_9 \cdot HI^{c_{10}},$$

where $F_p$ is the formation parameter, $c_i$ are a set of optimized coefficients, and the variable inputs are nuclear cross sections, bulk density, and other relevant properties (e.g., as discussed in the detailed description below) of the formation in which the forward model is to be run. The formation parameter can be converted to a synthetic detector measurement by a calibration function. In one example, the calibration function for the synthetic detector measurement (SDM) is a quadratic polynomial equation of the form $$\log(SDM) = a \cdot F_p^2 + b \cdot F_p + c$$

The method and system can employ a plurality of forward models that are used to derive a corresponding plurality of different synthetic detector measurements that relate to neutron-induced gamma-ray emission and possibly a direct neutron signal from the geological formation. The plurality of forward models can be used to measure the at least one property of the geological formation including bulk density of the geological formation. The plurality of forward models can correspond to different radiation detector measurements.

In some embodiments, the plurality of forward models includes a forward model for a near gamma-ray detector measurement that represents a count rate for gamma-rays that result from inelastic interaction of neutrons with the geological formation and that are detected by a near gamma-ray detector as well as a forward model for a far gamma-ray detector measurement that represents a count rate for gamma-rays that result from inelastic interaction of neutrons with the geological formation and that are detected by a far gamma-ray detector.

In some embodiments, the plurality of forward models includes a forward model for an epithermal neutron detector measurement that represents a count rate for epithermal neutrons that result from elastic and inelastic interactions of neutrons with the geological formation and that are detected by an epithermal neutron detector.

In another embodiment, the plurality of forward models includes a forward model for a thermal neutron detector measurement that represents a count rate for thermal neutrons that result from elastic and inelastic interactions of neutrons with the geological formation and that are detected by a thermal neutron detector.

In some embodiments, the plurality of forward models includes a forward model for a gamma-ray detector measurement that indirectly represents flux of thermal or epithermal neutrons that result from elastic and inelastic interactions of neutrons with the geological formation.

In some embodiments, the at least one forward model includes at least one nuclear parameter of the geological formation selected from the group consisting of:
  bulk density of the geological formation,
  electron density of the geological formation,
  hydrogen index of the geological formation,
  a slowing-down length $L_s$ of the geological formation,
  a thermal diffusion length $L_d$ of the geological formation,
  a neutron migration length $L_m$ of the geological formation,
  a fast slowing down length $L_f$ of the geological formation,
  porosity of the geological formation,
  water salinity of the geological formation,
  oil saturation of the geological formation,
  gas saturation of the geological formation,
  rock (matrix) bulk density of the geological formation,
  pore fluid bulk density of the geological formation, and
  at least one cross-section for particle interaction in the geological formation.

In yet another embodiment, the at least one forward model includes at least one nuclear parameter of the geological formation including at least one average macroscopic or microscopic cross-section evaluated over a range of neutron energy levels.

In some embodiments, the at least one forward model can be configured to account for spatial sensitivity of a respective radiation detector measurement. For example, the at least one forward model can be based on a spatial sensitivity function for a respective radiation detector measurement.

In another embodiment, the at least one forward model can be configured to account for potential variation in a respective radiation detector measurement (such as variation in formation signal, variation in tool background signal, variation in the borehole geometry and environment, variation in the operation of the downhole tool, and other possible variations).

The system can include a data processor configured to store at least one forward model, wherein the at least one forward model is used to derive at least one synthetic detector measurement that relates to neutron-induced gamma-ray emission from the geological formation and to measure at least one property (including bulk density) of the geological formation.

The system can also include a downhole tool including a neutron source and at least one radiation detector, wherein the neutron source is configured to emit neutrons into the geological formation to induce neutron interaction in the geological formation, and wherein the at least one radiation detector is configured to detect radiation related to the neutron interaction in the geological formation. The data processor can be further configured to derive at least one actual detector measurement that relates to the neutron-induced gamma-ray emission from the geological formation. And the data processor can be further configured to compare one or more synthetic detector measurements to corresponding one or more actual detector measurements in order to measure the at least one property (including bulk density) of the geological formation. The downhole tool can be a wireline tool or a logging-while-drilling tool.

Further features and aspects of example embodiments of the present invention are described in more detail below with reference to the appended Figures.

DETAILED DESCRIPTION

Figure 1A:
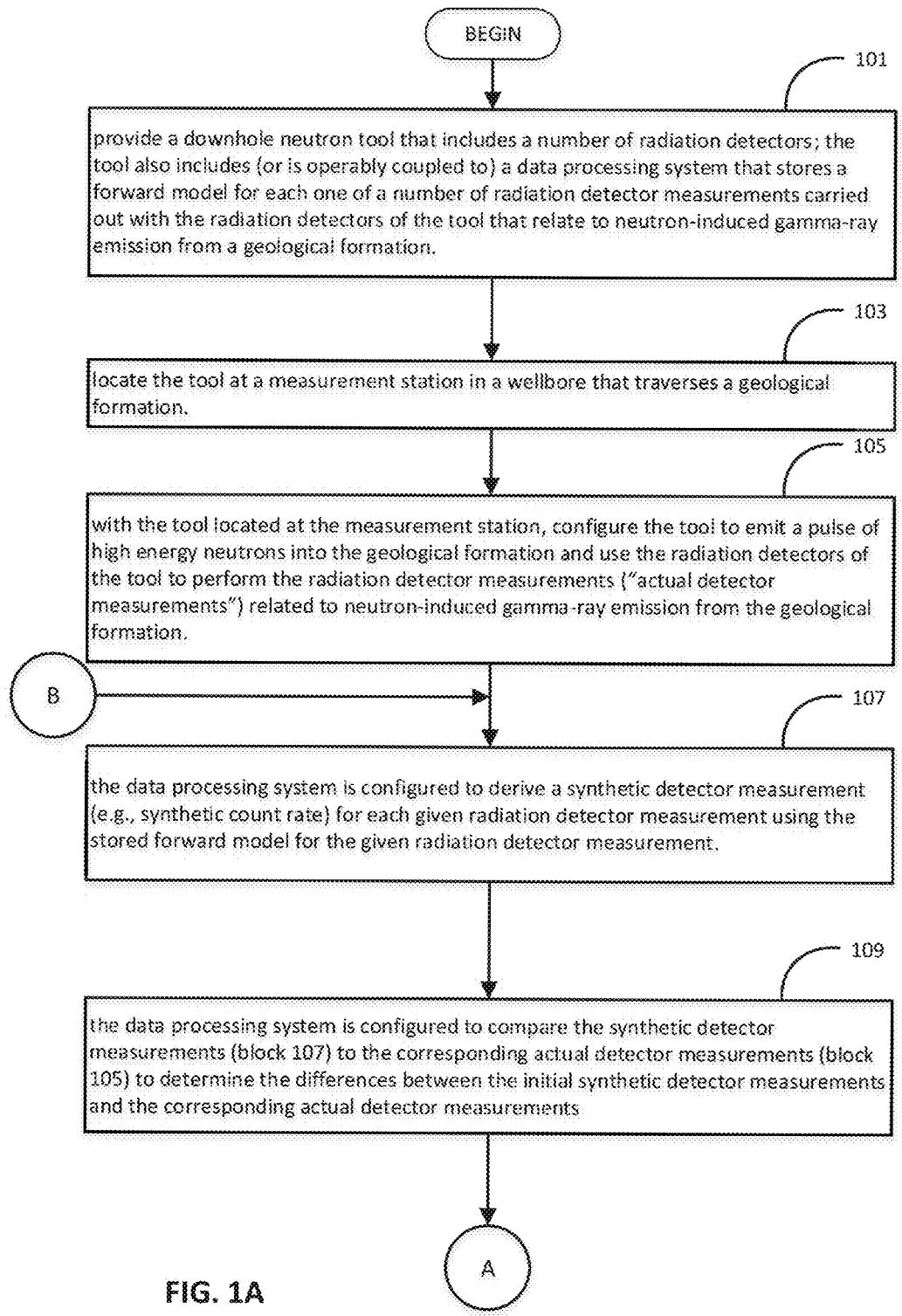
FIGS. 1A and 1B, collectively, is a flowchart illustrating an example workflow that employs forward models for radiation detectors of a downhole neutron tool to measure bulk density (and possibly other properties) of a geological formation.

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, systems, processes, and other elements in the invention may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but could have additional steps not discussed or included in a figure. Furthermore, not all operations in any particularly described process may occur in all embodiments. A process may correspond to a method, a function, a procedure, a subroutine, a subprogram, etc. When a process corresponds to a function, its termination corresponds to a return of the function to the calling function or the main function.

Furthermore, embodiments of the invention may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

The embodiments of the present application as described herein analyze bulk density of a geological formation with a downhole neutron tool that generates high energy neutrons in short bursts. The high energy neutrons have an energy greater than 1 MeV. Such high energy neutrons are emitted into the geological formation and interact (collide) with the various elements of the geological formation. The geological formation typically includes a rock matrix and pore space. The pore space can be filled with fluid, such as oil, gas, water, brine or combinations of such fluids. With successive interactions (collisions), the initial high-energy neutrons slow down and reach the thermal energy level of the geological formation. The neutrons at the thermal energy level of the geological formation are referred to herein as "thermal neutrons." Before the neutrons reach the thermal level of the geological formation, inelastic collisions occur between fast neutrons having an energy greater than approximately 1 MeV and atomic nuclei in the geological formation. Such inelastic collisions cause some atomic nuclei to become excited and emit one or more gamma-rays (referred to herein as "inelastic gamma-rays") as they return to ground state. Some of these inelastic gamma-rays travel back to the tool for detection and counting by the tool. The number of inelastic gamma rays that reach the tool is influenced by three primary factors: i) the transport of neutrons from the tool to the formation location where the inelastic gamma rays are produced, ii) the production of gamma rays through inelastic reactions of neutrons with the nuclei in the formation, wellbore, and tool, and iii) the transport of the inelastic gamma rays back to the tool, which is sensitive to the electron density of the geological formation. Properly characterized, the count of the inelastic gamma-rays can be used to compute electron density, which in turn can be used to compute bulk density of the geological formation. The inelastic gamma rays can also be used to compute bulk density directly.

Note that the thermal neutrons are eventually captured by atoms in the geological formation. Nuclei that capture thermal neutrons can emit gamma-rays (referred to herein as "capture gamma-rays") when returning to a stable energy state in a manner similar to the emission of inelastic gamma-rays. Interactions with neutrons may also cause nuclei to enter longer-lived excited states that emit gamma-rays (referred to herein as "activation gamma-rays") when returning to a stable energy state. Furthermore, the geological formation can produce naturally-occurring background gamma-rays. The contribution of capture gamma-rays, activation gamma-rays, and background gamma-rays can be compensated for in the measurement of bulk density of the geological formation.

Also note that there may be variations in the bursts of high energy neutrons generated and emitted by the downhole neutron tool. The downhole neutron tool can measure the neutron output and compensate for variations in the neutron output in the measurement of bulk density of the geological formation.

Also note that variations in the borehole geometries and environment (e.g., bore-hole size, mud weight and salinity, mudcake thickness, hydrostatic pressure, formation salinity and temperature) as well as variations in the operation of the downhole tool itself and possible other variations can be accounted for in the measurement of bulk density of the geological formation.

Figure 1B:
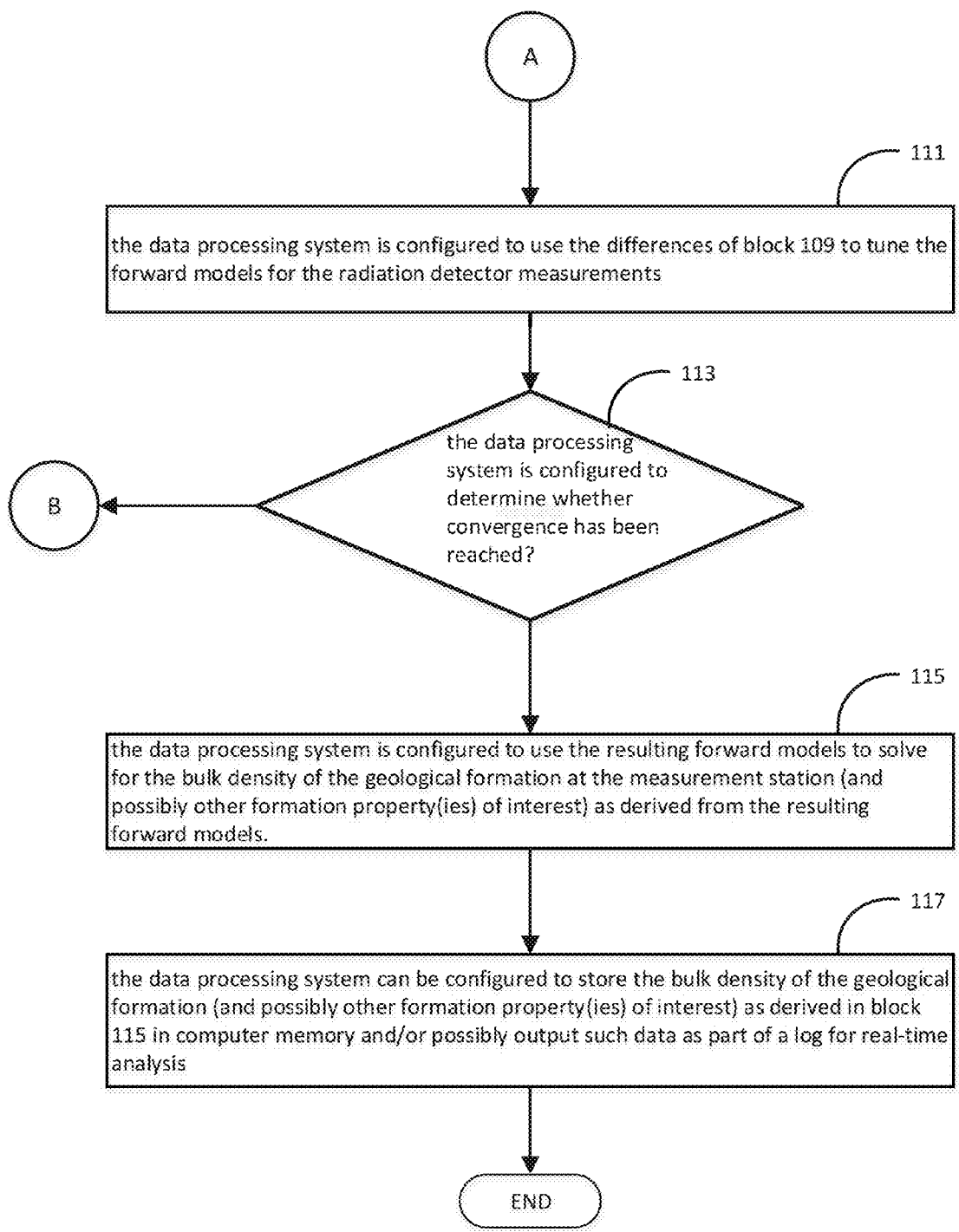

According to an embodiment illustrated in FIGS. 1A and 1B, a downhole neutron tool employing a number of radiation detectors is used as part of a workflow that measures bulk density (and possibly other properties) of a geological formation. In block 101, the downhole neutron tool is provided. The downhole neutron tool includes (or is operably coupled to) a data processing system that stores a forward model for a number of different radiation detector measurements carried out by the operation of radiation detectors of the downhole neutron tool. The forward model corresponding to a respective radiation detector measurement is a representation, mathematical or otherwise, that employs properties of the geological formation to predict the radiation detector measurement (e.g., count rate). The predicted radiation detector measurements (e.g., predicted count rates) are referred to here as "synthetic detector measurements" or individually as a "synthetic detector measurement." The forward model for each respective radiation detector measurement can be calibrated according to experimental data taken in a controlled environment (and possibly data derived from benchmark modeling that supplements the experimental data) and then stored by the data processing system.

In some embodiments, the forward model for a respective radiation detector measurement of the downhole neutron tool includes a characteristic "formation parameter" defined by a linear or non-linear combination of relevant properties of the geological formation. The choice of relevant properties and the resulting combined formation parameters can vary for different radiation detector measurements of the downhole neutron tool. The value of combining multiple formation properties into a single characteristic formation parameter is that the functional combination can be constructed to have a unique predictive relationship with the count rate of an actual detector measurement that would be recorded in a formation with the given properties, whereas the individual properties alone would have a non-unique relationship with the detector measurement. For example, one embodiment of the formation parameter for inelastic gamma-ray count rates may be expressed as $$F_p = c_1 \cdot \Sigma_{absorption}{}^{c2} + c_3 \cdot \rho_b{}^{c4} + c_5 \cdot \Sigma_{elastic}{}^{c6} + c_7 \cdot L_s{}^{cB} + c_9 \cdot HI^{c10}, \quad (1)$$

where $F_p$ is the characteristic formation parameter of the geological formation given the several input properties of the expression; $\Sigma_{absorption}$ is the macroscopic cross section for total neutron absorption in that formation averaged over neutron energies from 1-14.1 MeV and using the macroscopic cross section for total gamma-ray production as a weighting function; $\rho_b$ is the bulk density of the geological formation; $\Sigma_{elastic}$ is the macroscopic cross section for elastic neutron scattering in that formation averaged over neutron energies from 1-14.1 MeV and using the macroscopic cross section for total gamma-ray production as a weighting function; $L_s$ is the slowing-down length of neutrons beginning at 14.1 MeV in that formation; HI is the hydrogen index of the formation, and $c_1$-$c_{10}$ are a set of coefficients that are optimized in a dataset of experimental measurements. The coefficients can also be optimized in a set of benchmark-modeled measurements, for example through the Monte Carlo modeling method, or any combination of experimental and modeled measurements. One example of a set of optimized coefficients is shown in Table 1 for inelastic gamma-ray count rates measured at each of the near and far gamma-ray detectors.

TABLE 1

Example set of coefficients optimized for the characteristic formation parameters of inelastic gamma-ray measurements as expressed in Equation 1.

|  | Inelastic gamma-ray count rate at near gamma-ray detector | Inelastic gamma-ray count rate at far gamma-ray detector |
| --- | --- | --- |
| c1 | 1.853958 | 0.966018 |
| c2 | 1.015323 | 0.766196 |
| c3 | 0.973514 | 0.077863 |
| c4 | −0.0324 | 0.918105 |
| c5 | 0.585744 | 3.495026 |
| c6 | 0.249765 | 0.042135 |
| c7 | 1.581748 | 1.151371 |
| c8 | −0.00662 | −0.018937 |
| c9 | 0.025998 | 0.077209 |
| c10 | 1 | 1 |

Figure 5:
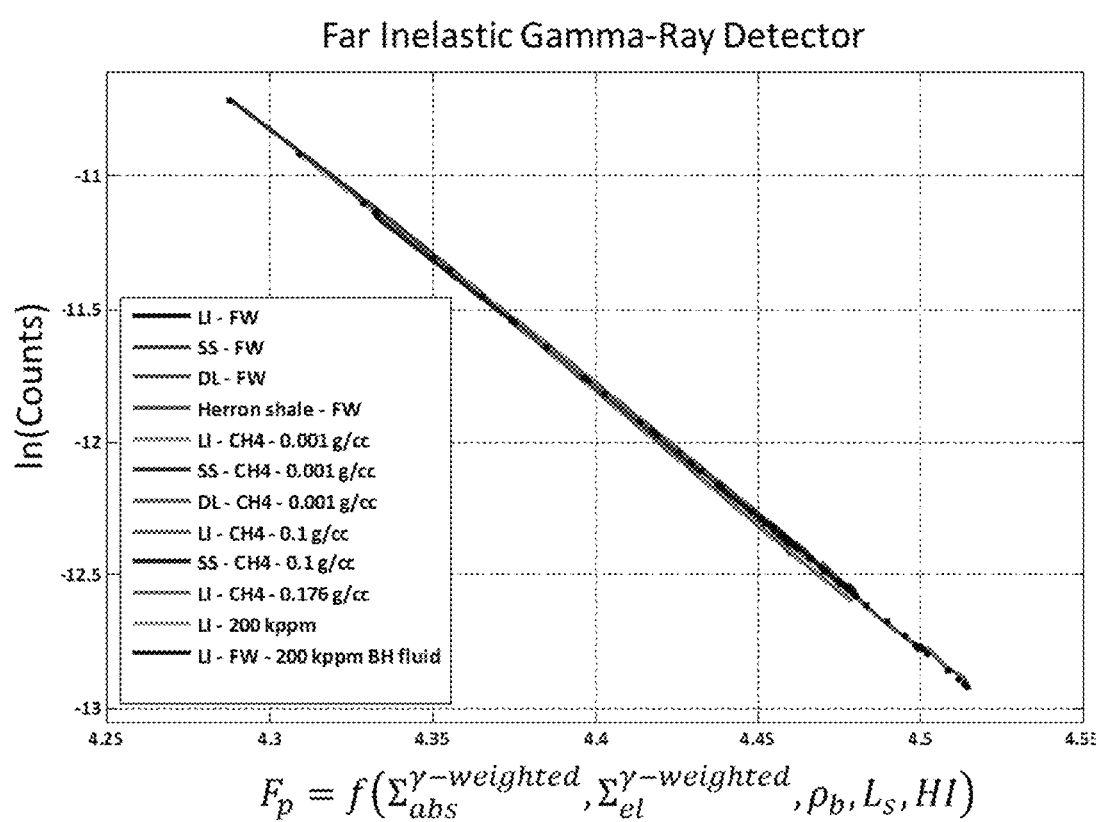
FIG. 5 is a plot that illustrates the count rate detected by the far gamma-ray detector of a downhole neutron tool as predicted by an optimized formation parameter that uses a combination of high-energy neutron cross sections for elastic scattering, total neutron absorption, and total gamma-ray production, in addition to bulk density, slowing-down length $L_s$, and hydrogen index.
Figure 6:
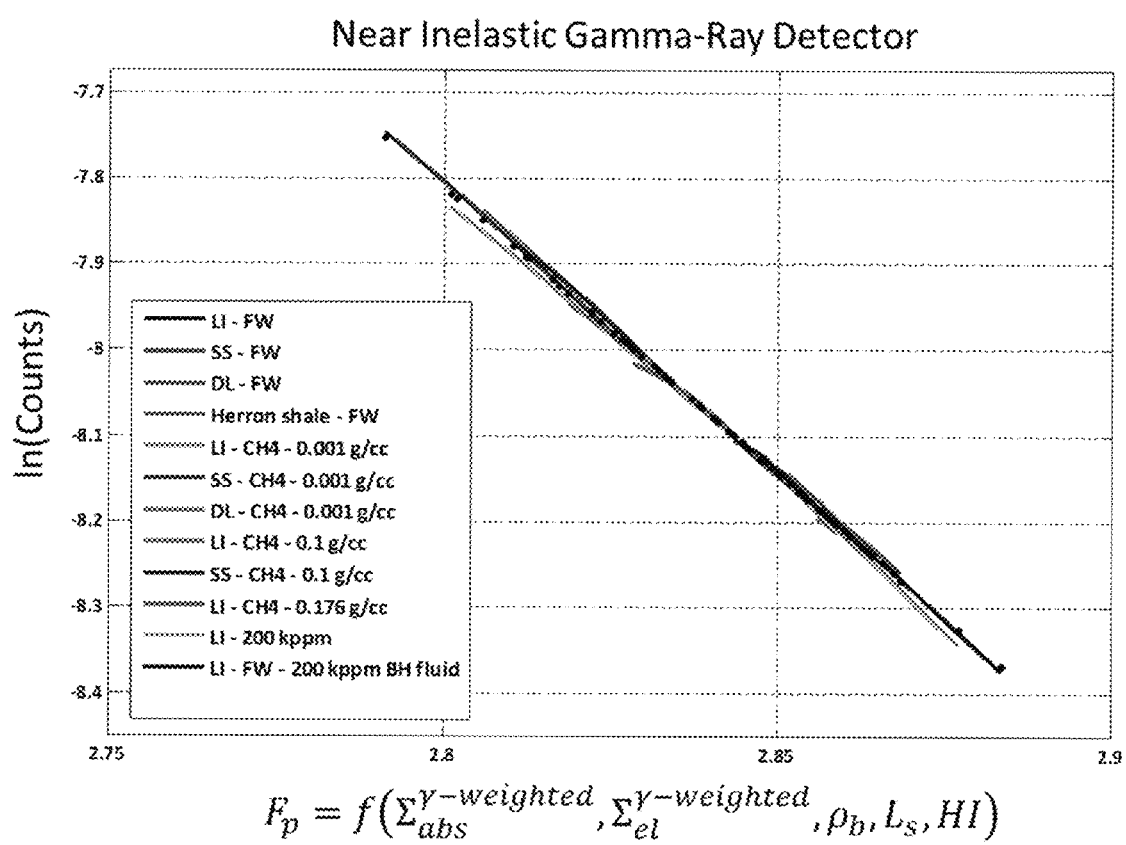
FIG. 6 is a plot that illustrates the count rate detected by the near gamma-ray detector of a downhole neutron tool as predicted by an optimized formation parameter that uses a combination of high-energy neutron cross sections for elastic scattering, total neutron absorption, and total gamma-ray production, in addition to bulk density, slowing-down length $L_s$, and hydrogen index.

FIG. 5 and FIG. 6 show examples of the predictive relationship between the above formation parameters Fp and the far and near inelastic gamma-ray measurements, respectively, for a variety of lithologies, porosities, and pore fluids. Given the set of relevant properties as inputs, the Fp combination enables the detector count rates to be predicted (thus creating the synthetic detector measurements).

In another example, the formation parameter for epithermal neutron count rates at a near epithermal neutron detector may be expressed as $$F_p = c_1(L_s{}^{c2} + c_3 \cdot L_d{}^{c4}) + c_5 \cdot \rho_b{}^{c6} + c_7 HI^{c8},$$

where $F_p$ is the characteristic formation parameter of the geological formation given the several input properties; $L_s$ is the slowing-down length of neutrons beginning at 14.1 MeV in that formation; $L_d$ is the diffusion length of thermal neutrons in that formation; $\rho_b$ is the bulk density of the geological formation; HI is the hydrogen index of the formation; and $c_1$-$c_8$ are a set of optimized coefficients. One example of a set of optimized coefficients is shown in Table 2.

TABLE 2

Example set of coefficients optimized for the characteristic formation parameter of the near epithermal neutron measurement as expressed in Equation 2.

|  | Near epithermal count rate |
| --- | --- |
| c1 | −0.864748 |
| c2 | −0.685554 |
| c3 | 0.245877 |
| c4 | −0.048425 |
| c5 | 0.026564 |
| c6 | 1.237720 |
| c7 | −0.107749 |
| c8 | 1 |

Figure 7:
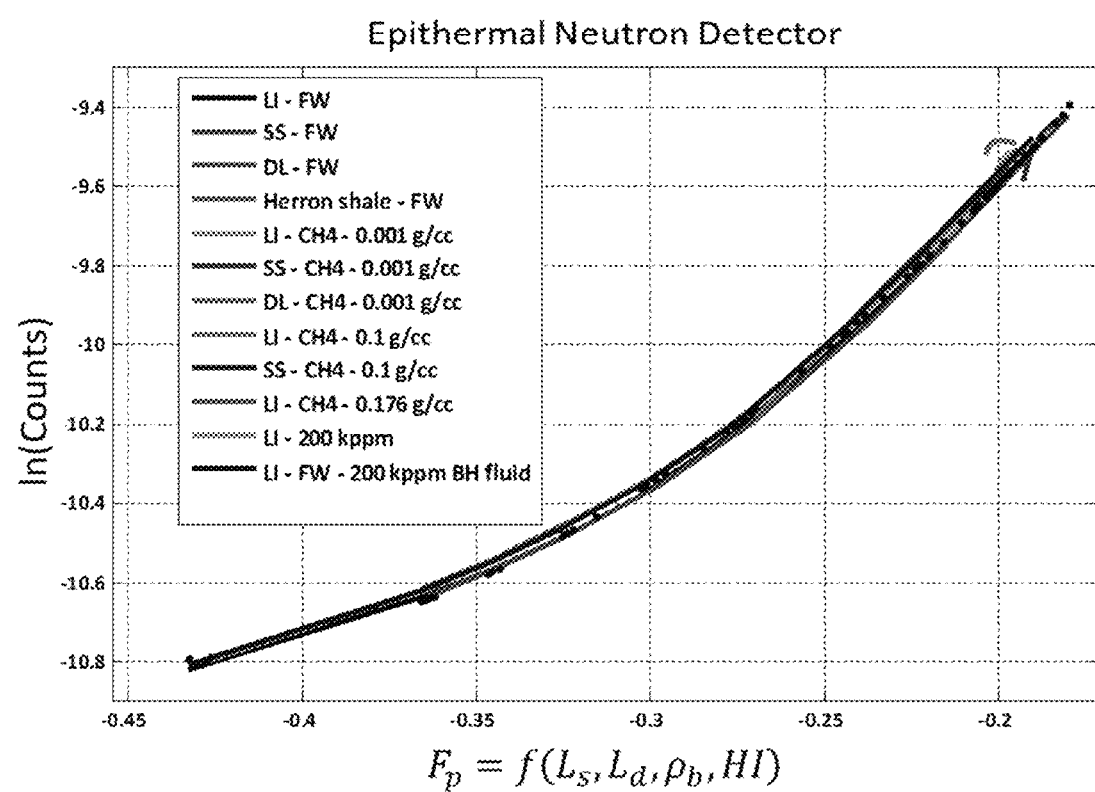
FIG. 7 is a plot that illustrates the count rate detected by the near epithermal neutron detector of a downhole neutron tool with respect to an optimized formation parameter that uses a combination of slowing-down length $L_s$, thermal diffusion length $L_d$, bulk density, and hydrogen index.

FIG. 7 shows an example of the predictive relationship between this formation parameter Fp and the near epithermal neutron measurement for a variety of lithologies, porosities, and pore fluids.

It will appreciated that these functional forms for the formation parameter $F_p$ are among many possibilities of linear and nonlinear combinations of parameters that provide a predictive relationship to count rate measurements, and the foregoing examples are intended to be representative but not restrictive of all possibilities.

The formation parameter can be converted to the synthetic detector measurement (e.g., synthetic count rate) by a calibration function as follows:

$$\log(SDM) = f_{calibration}(F_p) \quad (3)$$

where $f_{calibration}$ is the calibration function applied to the formation parameter $F_p$ to give the synthetic detector measurement SDM.

The calibration functions for the respective synthetic detector measurements can be non-linear or linear functions. In some embodiments, the calibration functions for the respective synthetic detector measurements are quadratic polynomial equations of the form:

$$\log(SDM) = a \cdot F_p{}^2 + b \cdot F_p + c, \quad (4)$$

where the parameters a, b and c are coefficients derived by calibration.

The calibration equations for the respective synthetic detector measurements can be derived from experimental data taken in a controlled environment (and possibly data derived from benchmark modeling that supplements the experimental data) and then stored by the data processing system.

For example, consider an embodiment where the downhole neutron tool includes a neutron monitor, a far gamma-ray detector, a near gamma-ray detector, a far thermal neutron detector, a near thermal neutron detector, and a near epithermal neutron detector. In this case, the neutron monitor can be configured to measure the neutron output and used to minimize variations in the neutron output relative to the desired neutron emission profile. The far and near gamma-ray detectors can be configured to detect gamma-rays produced in one or more time gates offset from the burst gate (such as an early capture time gate and a late capture time gate) that is synchronized with the emission of the high energy neutrons and inelastic neutron interaction with the geological formation. The counts of the far and near detected gamma-rays produced during the burst gate can be processed to measure far and near counts rates for the far and near detected gamma-rays produced from inelastic neutron reactions. Two different forward models can be provided to predict the count rates for the inelastic gamma-rays detected by the far and near gamma-ray detectors. Examples of these two forward models are discussed above with respect to FIGS. 5 and 6. A forward model can be provided to predict the epithermal neutron count rate as detected by the near epithermal detector. An example of this forward model is discussed above with respect to FIG. 7. A forward model can also be provided to predict the thermal neutron count rate as detected by the near and/or far thermal neutron detectors, as is known in the art. Note that forward models are not used for the measurements of the neutron monitor of the downhole tool in some of such embodiments. Thus, it is not required that forward models be provided for all of the radiation detectors of the downhole neutron tool. However, in some embodiments, forward models for the measurement of the neutron monitor or other detectors of the downhole tool can be added and used, if desired. The forward models that predict the various detector measurements ("synthetic detector measurements") are stored by the data processing system for use in the workflow.

During operation (block 103), the downhole neutron tool is located at a measurement station in a wellbore that traverses the geological formation. In the context of the present application, a measurement station may encompass, in some examples, use of a continuous moving log.

In block 105, with the tool located at the measurement station of block 103, the downhole neutron tool is configured to emit high energy neutrons into the geological formation. The high energy neutrons have an energy greater than 1 MeV. Such high energy neutrons interact (collide) with the various elements of the geological formation. The radiation detectors of the downhole neutron tool are used to measure a number of responses (referred to herein as "actual detector measurements") that relate to inelastic interaction of neutrons with the geological formation. In some examples the radiations detectors are also configured to directly measure neutrons in addition to gamma rays.

For example, consider the embodiment described above where the downhole neutron tool includes a neutron monitor, a far gamma-ray detector, a near gamma-ray detector, a far thermal neutron detector, a near thermal neutron detector, and a near epithermal neutron detector. In this case, the neutron monitor can be configured to measure the neutron output and can be used to minimize variations in the neutron output relative to the desired neutron emission profile. The far and near gamma-ray detectors can be configured to detect gamma-rays produced in one or more time gates offset from the burst gate (such as an early capture time gate and a late capture time gate) that is synchronized with the emission of the high energy neutrons and the inelastic neutron interaction with the geological formation. The counts of the far and near detected gamma-rays produced during the burst gate can be processed to measure far and near counts rates for the far and near detected gamma-rays produced from inelastic neutron reactions. The near epithermal detector can be configured to measure the count rate of neutrons in the epithermal energy regime. The near and far thermal detectors can be configured to measure the count rate of neutrons in the thermal energy regime.

General methods for inversion are known in the art. In blocks 107-113, an inversion process is carried out by the data processing system using the stored forward models for the number of radiation detector measurements carried out by the radiation detectors of the downhole neutron tool. The goal is to find the properties of the geological formation and wellbore, including the formation bulk density, that cause the synthetic detector measurements to best match the actual detector measurements. The true formation bulk density is thus inferred. The inversion process begins in block 107 where the data processing system is configured to employ the stored forward models to derive an initial synthetic detector measurement (e.g., synthetic count rate) based on a hypothesis of relevant properties of the geological formation and wellbore for each of one or more (or in some examples, all) of the number of different radiation detector measurements carried out by the operation of the radiation detectors of the downhole neutron tool. In block 109, the data processing system is configured to compare the initial synthetic detector measurements to the corresponding actual detector measurements to determine the differences between the initial synthetic detector measurements and the corresponding actual detector measurements. In block 111, the data processing system is configured to use the differences of block 109 to tune the input properties of the forward models for the number of radiation detector measurements. The tuning process may involve constructing a global cost function to quantify the aggregate disagreement of the synthetic and actual measurements for the chosen set of detectors, where the processing system seeks to minimize the cost function at each measurement location. The disagreement of the synthetic and actual measurements can also be minimized in a sequential workflow for each of the chosen detectors, iterating through the list until convergence is reached. The inversion process may be performed once for each measurement location, or the formation may be divided into layers or other zones over which the relevant properties are solved as a constant set. The mathematical process of tuning the parameters of the formation and wellbore may employ the method of Gauss-Newton minimization or other variants that are known in the art. In block 113, the data processing system is configured to determine whether convergence has been reached where the synthetic detector measurement(s) match the actual detector measurement(s) within a predefined tolerance constraint. If not, the inversion process of blocks 107-113 is iteratively repeated using the tuned forward models until convergence is reached.

After convergence, the workflow continues to block 115 where the data processing system is configured to use the resulting tuned forward models to solve for the bulk density of the geological formation at the measurement station (and possibly other formation and wellbore property or properties of interest) as derived from the resulting tuned forward models. In block 117, the data processing system can be configured to store the bulk density of the geological formation (and possibly other formation property or properties of interest) as derived from the resulting forward models in block 115 in a computer memory and/or possibly output such data as part of a log for real-time analysis.

The downhole nuclear measurements and inversion process can be repeated over multiple measurement stations within the wellbore as desired.

This framework can be used to determine formation properties in complex logging environments. It is also useful in well placement, in which a well trajectory is planned through a hypothesized earth model. In this case, the forward models for the respective radiation detectors can be used to solve for an expected log response (formation property at the measurement station). The expected log response can be compared to the earth model to make decisions about steering the drill bit or make an adjustment to the earth model.

The formation properties of the forward model can include one or more of the following:

bulk density of the geological formation.

electron density of the geological formation.

hydrogen index of the geological formation.

a slowing-down length $L_s$ of the geological formation. The slowing-down length $L_s$ is a parameter used to characterize neutron interactions in the geological formation above the thermal region. The slowing-down length $L_s$ is proportional to the root-mean-square distance from the point of emission of a high-energy neutron to the point at which its energy has decreased to the lower edge of the epithermal energy region. Thermal neutrons have about the same energy as the surrounding matter, typically less than about 0.4 eV (0.025 eV at room temperature), while epithermal neutrons have higher energy, between about 0.4 and 10 eV.

A thermal diffusion length La of the geological formation; the thermal diffusion length is a parameter used to characterize thermal neutron interactions in the geological formation. The thermal diffusion length $L_d$ is the characteristic distance between the point at which a neutron becomes thermal and the point of its final capture. The thermal diffusion length $L_d$ is related to the quantity of thermal absorbers in the formation.

a neutron migration length $L_m$ of the geological formation. The neutron migration length $L_m$ is a parameter used to characterize thermal neutron interactions in the geological formation. The neutron migration length $L_m$ is the characteristic distance a neutron travels while slowing down as a fast neutron (which has an energy greater than 1 MeV) and diffusing as a thermal neutron.

a fast slowing down length $L_f$ of the geological formation; the fast slowing down length $L_f$ is a parameter used to characterize neutron interactions in the geological formation. The fast slowing down length $L_f$ is the characteristic distance required for neutrons to slow down form the source energy to a cutoff energy which is appropriate for the measurement being modeled. One example is the RMS distance required for neutrons to slow down from a source energy of 14.1 MeV to 1 MeV in various minerals and fluid components.

Porosity of the geological formation.

Water salinity of the geological formation.

Oil saturation of the geological formation.

Gas saturation of the geological formation.

Rock (matrix) bulk density of the geological formation.

Pore fluid bulk density of the geological formation.

macroscopic and/or microscopic cross-sections for particle interaction in the geological formation. Macroscopic cross-sections represent the probability of interaction per unit length traveled by a particle through the geological formation, whereas microscopic cross-sections represent the cross-section per nucleus as opposed to unit length. The particles described by the cross-section data can be neutrons, gamma-rays, protons, electrons and others. Neutron cross sections can be used to express the likelihood of interaction between an incident neutron and a target nucleus for various elemental combinations.

The macroscopic and/or microscopic cross-sections can include, but are not limited to cross-section for elastic scattering of neutrons.

cross-section for individual inelastic scattering reactions of neutrons, such as (n, p), (n, alpha), and (n, n') reactions.

cross-section for total inelastic scattering of neutrons.

cross-sections for absorption of neutrons.

cross-sections for gamma-ray production from neutrons.

One or more of the cross-sections can be evaluated at the high-energy level of the neutrons generated and emitted by the downhole neutron tool, at the thermal energy of the geological formation or at some other neutron source energy.

Figure 8:
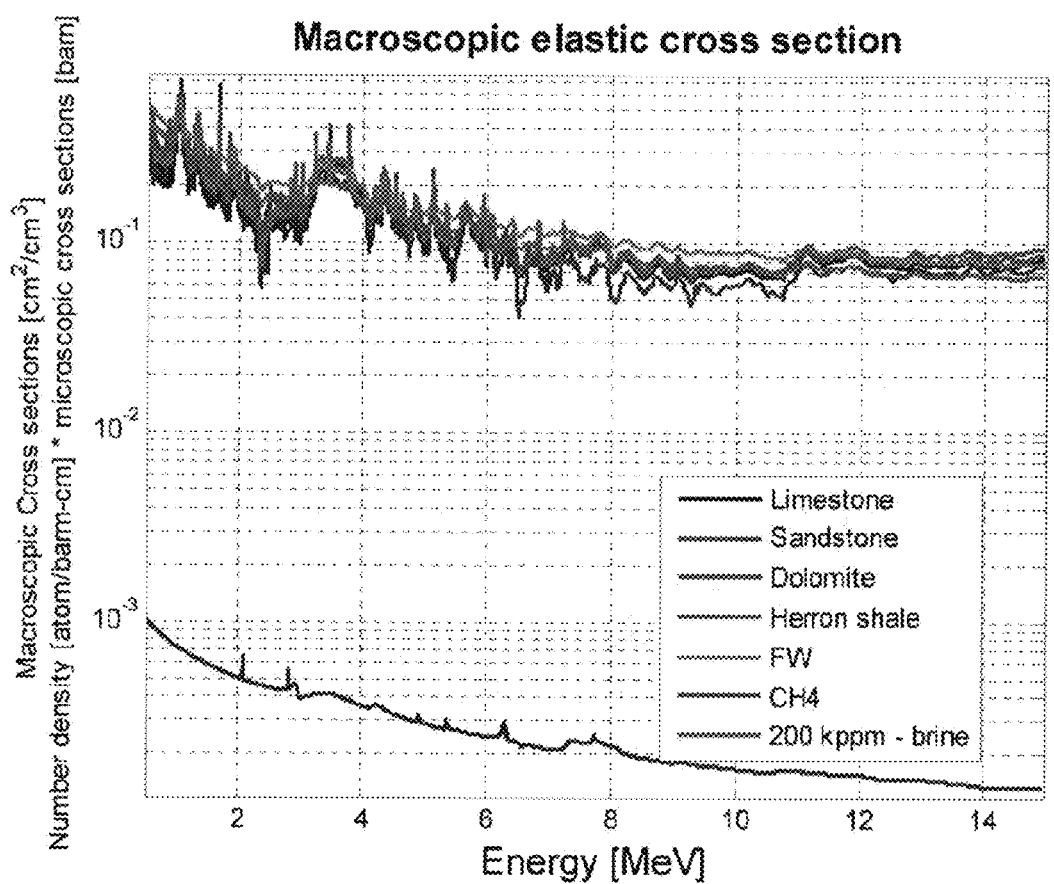
FIG. 8 is a plot that illustrates macroscopic cross section data for elastic scattering of neutrons in various common minerals and fluid components in the high-energy neutron regime.

One or more of the cross-sections can be derived by averaging macroscopic cross-sections that have been evaluated over a range of neutron source energy levels. The averaging can involve a weighting function that applies different weight factors to the cross-sections at specific energy levels. In some embodiments, the weight factor for a particular energy level can be derived from the cross-section for gamma-ray production from neutron at that particular energy level normalized relative to the cross-section for gamma-ray production from neutrons for the range of neutron source energy levels. FIG. 8 shows macroscopic cross-sections for elastic scattering of neutrons in various common minerals and fluid components.

The forward models for the respective radiation detector measurements of the downhole neutron tool can be configured to account for spatial sensitivity of the respective radiation detector measurements. This feature can aid in the accuracy of the forward models in complex logging environments. For example, the forward models can employ spatial sensitivity functions similar to those described in:

C. Watson, "Monte Carlo Computation of Differential Sensitivity Functions," Trans. Am. Nucl. Soc., Vol. 46, 1984, page 655.

T. Zhou et al., "A Second-Order Fast-Forward Model for a Gamma-Gamma Density Logging Tool," SPE 124193, SPE Annual Technical Conference and Exhibition, New Orleans, La., USA, 2009.

A. Mendoza et al., "Rapid Simulation of Borehole Nuclear Measurements with Approximate Spatial Flux-Scattering Functions," Symposium of the Society of Petrophysicists and Well-Log Analysts, 2007.

In some embodiments, the forward models for the respective radiation detector measurements can employ a Flux Sensitivity Function (FSF), which is a map of spatial sensitivity that describes the importance of certain nuclear properties of the geological formation to a synthetic detector measurement. In a complex logging environment where the measurement response at a fixed tool position overlaps with regions of the formation with multiple different nuclear properties, the FSF provides relative weights for the contributions of the different regions in the overall measurement made by the particular radiation detector. For example, the FSF weights at various points in three-dimensional space near a measurement station can be combined with a formation parameter evaluated at the various points in three-dimensional space near the measurement station to provide for an effective formation parameter for the measurement station. This is expressed in Eqn. (3) below:

$$F_p = \Sigma_{3D} FSF_{3D}{}^{F_p} \cdot F_{P3D'} \quad (3)$$

where $FSF_{3D}{}^{F_p}$ is the FSF weight for the formation parameter $F_{P3D}$ evaluated at a particular point in space, whose products are summed over the three dimensional space near the measurement location to provide the effective formation parameter $F_p$ for the measurement station.

Figure 9:
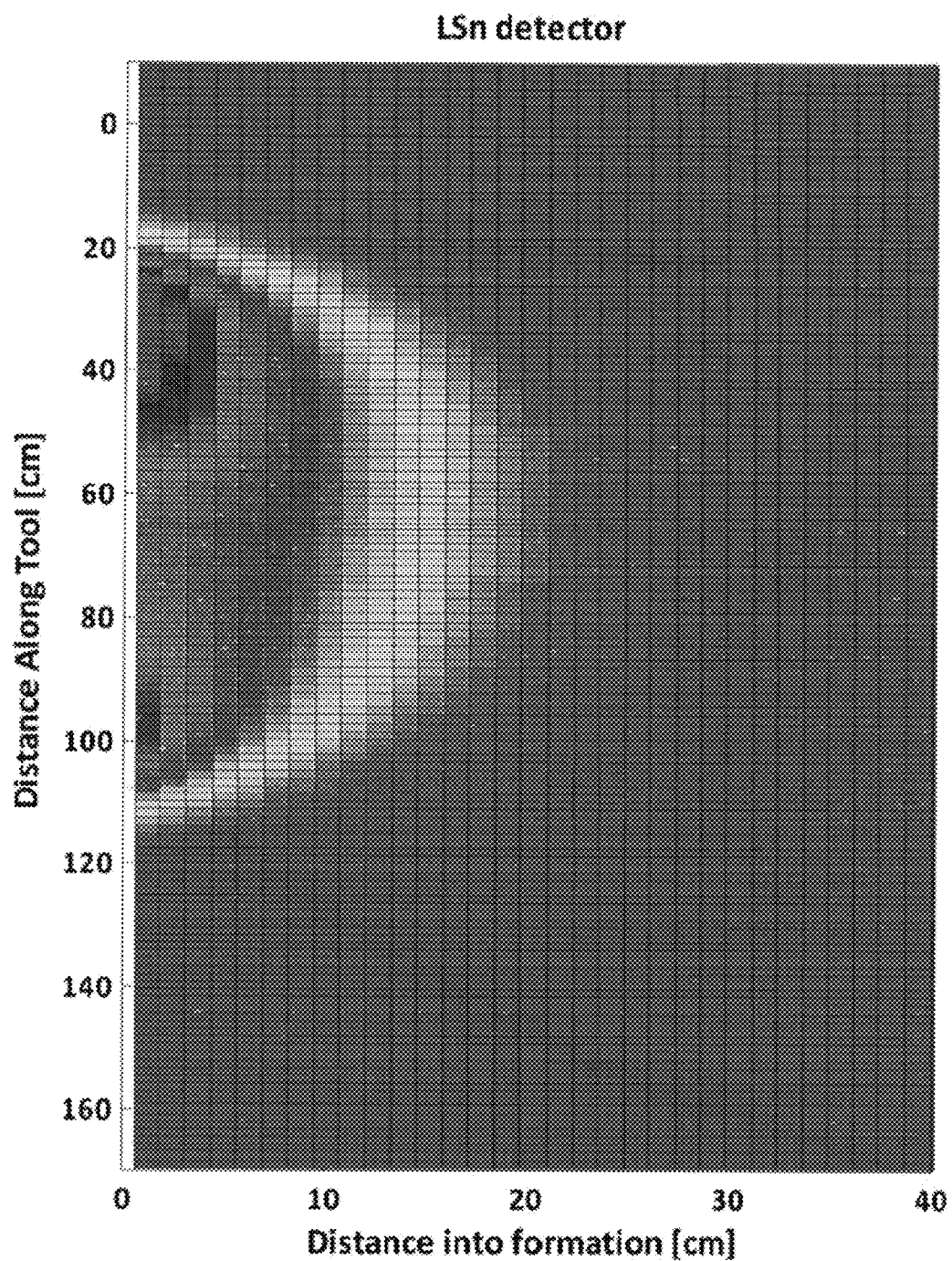
FIG. 9 is a plot that illustrates an example of a two-dimensional spatial sensitivity function for an inelastic gamma-ray count rate predicted by a forward model of a gamma-ray detector of a downhole neutron tool.

Because the shape of the FSF itself may be a function of the formation parameter, the effective formation parameter may be estimated by taking an "average" or "typical" FSF, multiplying this FSF with earth model values of the formation parameter and using the resulting formation parameter to choose the FSF used in Eqn. (3). Different variations on this method can also be used as are known in the art. For example, the FSF can describe spatial sensitivity in one, two or three dimensions and thus can be evaluated in combination with the formation parameter over such dimensional space. FIG. 9 shows an example of an FSF for an inelastic gamma-ray count rate.

Figure 10:
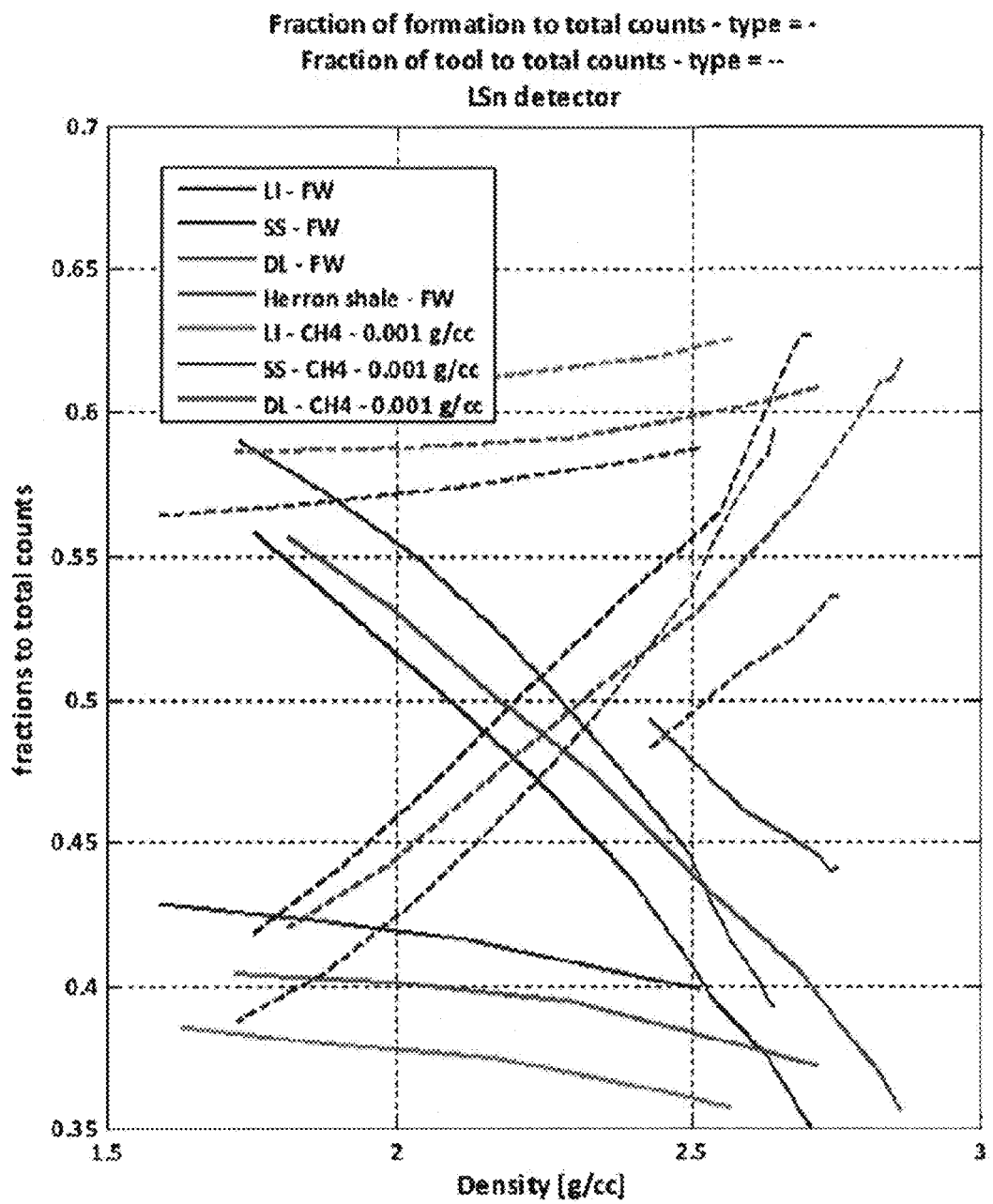
FIG. 10 is a graph that illustrates an example of the relative fractions of formation signal and tool background with respect to bulk density for different geological formations, as modeled for inelastic gamma-ray counts at a far gamma-ray detector of a downhole neutron tool.

The forward models for the respective radiation detector measurements of the downhole neutron tool can also be configured to account for contributions of capture gamma-rays and background gamma-rays (formation signal), tool background signal, variations in the borehole geometries and environment (e.g., bore-hole size, mud weight and salinity, mudcake thickness, hydrostatic pressure, formation salinity and temperature) as well as variations in the operation of the downhole tool itself and possible other variations. Note that the detector measurement (e.g., count rate) contributions of the formation signal and the tool background signal may not only exhibit different dependences on nuclear properties of the formation, but it is likely that the three-dimensional spatial sensitivities of these contributions can also dependent differently on formation properties as well as borehole geometries and environment. FIG. 10 shows an example of the relative fractions of formation signal and tool background signal with respect to bulk density for different geological formations, as modeled for inelastic gamma-ray counts at a far gamma-ray detector.

In some embodiments, the forward model for a given radiation detector measurement of the downhole neutron tool can be expressed as a sum of separately modeled components for the formation signal, the tool background, the borehole geometry, the borehole environment, etc. as follows:

$$\log(SDM) = f_{formation}(F_p^{formation}) + f_{tool}(F_p^{tool}) + \ldots \quad (4)$$

where $f_x$ and $F_p^x$ represent a calibration function and characteristic formation parameter that describes the contribution to the synthetic detector measurement (SDM) for a given component X, where the component X may include the formation signal, the tool background, the borehole geometry, the borehole environment, and possibly others.

The characteristic formation parameter $F_p^x$ for a given component X can include one or more of the nuclear parameters described herein.

For each component X, the forward model can be expanded to multiple spatial dimensions by applying a sum over space weighted by an FSF or other spatial sensitivity function which is specified for that component. An example where the forward model is expanded in three spatial dimensions can be expressed as follows:

$$F_p^x = \Sigma_{3D} FSF_{3D}^x \cdot F_{P3D}^x \quad (5)$$

where $FSF_{3D}^x$ is the FSF weight for the characteristic formation parameter $F_{P3D}^x$ for the component X evaluated at a particular point in space, whose products are summed over the three dimensional space near the measurement location to provide the effective formation parameter $F_p^x$ for the component X at the measurement location.

Note that the summation over space is not limited to three dimensions, but may be applied to points in one-dimensional, two-dimensional or three-dimensional space.

Plugging Eqn. (5) into Eqn. (4) gives:

$$\log(SDM) = f_{formation}(\Sigma_{3D} FSF_{3D}^{formation} \cdot F_{P3D}^{formation}) + f_{tool}(\Sigma_{3D} FSF_{3D}^{tool} \cdot F_{P3D}^{tool}) + \ldots \quad (6)$$

Figure 11:
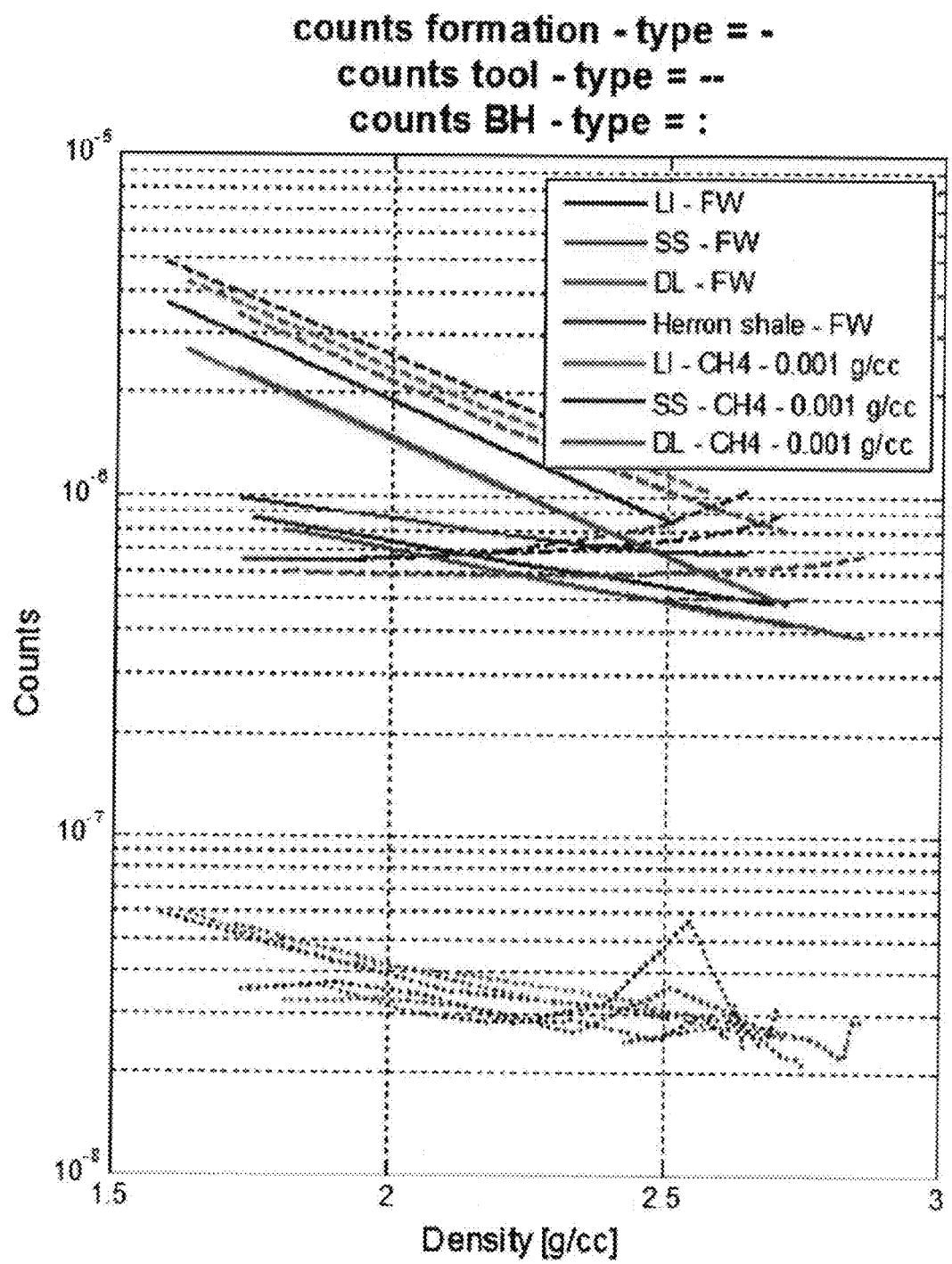
FIG. 11 is a graph that illustrates an example of the absolute contributions of formation signal, tool background, and borehole background with respect to bulk density for different geological formations, as modeled for inelastic gamma-ray counts at a far gamma-ray detector of a downhole neutron tool.

Note that in dividing the synthetic detector measurement (SDM) into components, it is possible to group components as a common unit. For example, the contributions from tool background and the borehole geometry and the borehole environment can be grouped together as a common unit and treated separately from the formation background signal. FIG. 11 shows an example of the absolute contributions of formation signal, tool background, and borehole background with respect to bulk density for different geological formations, as modeled for inelastic gamma-ray counts at a far gamma-ray detector.

Figure 2:
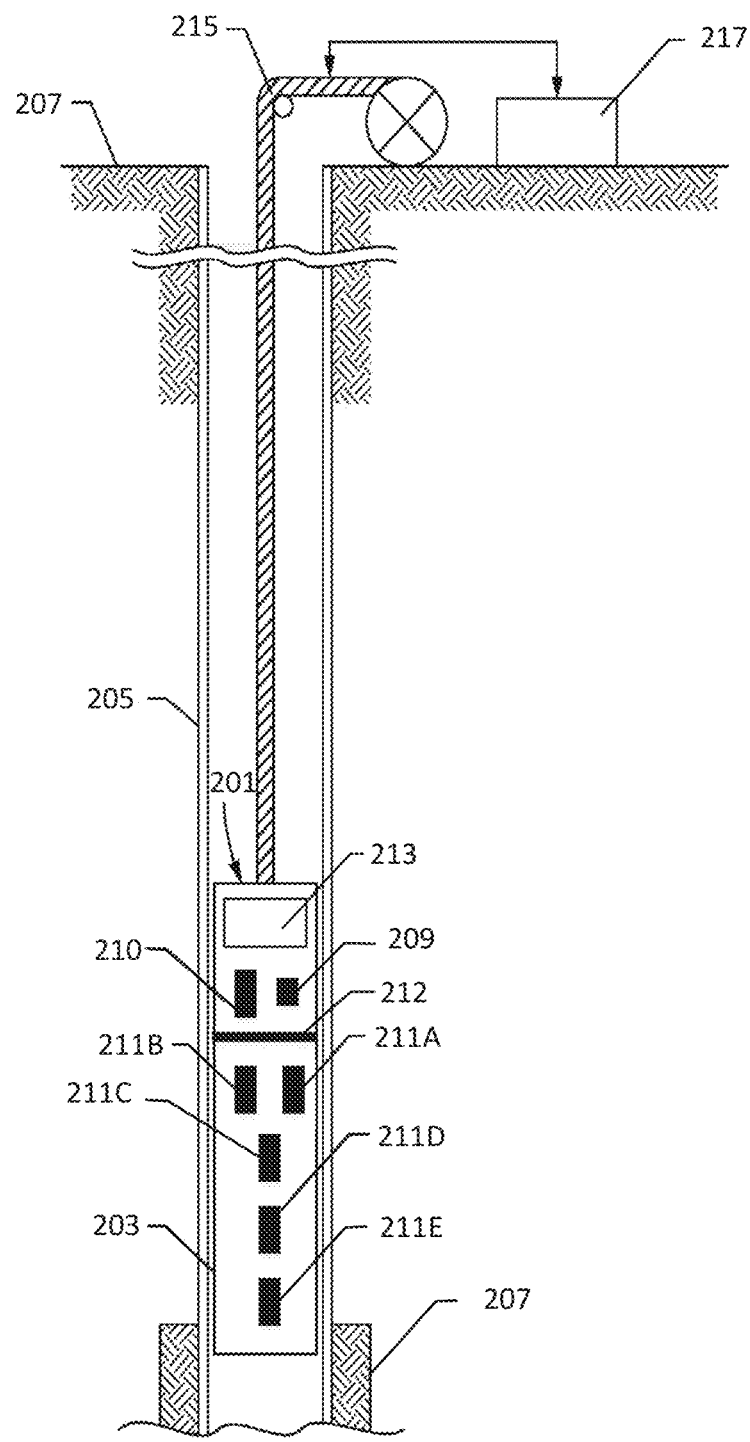
FIG. 2 shows an example wireline well logging system that is suitable for carrying out the workflow of FIGS. 1A and 1B.

FIG. 2 shows an example well logging system that is suitable for carrying out the workflow of FIGS. 1A and 1B. The system includes a downhole well logging instrument 201 with measurement components disposed in a housing 203 shaped and sealed to be moved along the interior of a wellbore 205 that traverses a geological formation 207. The housing 203 can be formed from steel or other suitable material. The housing 203 may contain a neutron source 209, a neutron monitor 210, and a number of radiation detectors 211A, 211B, 211C, 211D, and 211E. The neutron source 209 may be any suitable neutron source capable of emitting high energy neutrons into the surrounding geological formation 207 to produce inelastic gamma-rays. By way of example, the neutron source 209 may be a pulsed electronic neutron source that emits high energy neutrons at or near 14.1 MeV into the surrounding geological formation 207. Additionally or alternatively, in certain embodiments, the neutron source 209 may be a radioisotope source capable of emitting high energy neutrons. The neutron monitor 210 can be located near the neutron source 209 and configured to detect primarily unscattered neutrons that are emitted directly from the neutron source 209. The neutron monitor 210, which may be a plastic scintillator and photodetector, can provide a count rate signal proportional to the neutron output rate from the neutron source 209. A neutron shield 212 containing elements with high (n,2n) cross sections, such as lead, bismuth or tungsten, may separate the neutron source 209 from the detectors 211A, 211B, 211C, 211D and 211F. Detectors 211A and 211D are near and far thermal neutron detectors (such as a 3He neutron detectors) at different axial spacing relative to the neutron source 209. Detector 211B is a near epithermal neutron detector (such as a 3He neutron detector) offset laterally from the near thermal neutron detector at or near the same axial spacing as the near thermal neutron detector 211A. The near epithermal neutron detector 211B can employ thermal neutron shielding that serves to block thermal neutrons from reaching the neutron detector 211B such that the epithermal neutron detector 211B primarily detects epithermal neutrons rather than thermal neutrons. Detectors 211C and 211E are near and far gamma-ray detectors at different axial spacing relative to the neutron source 209. The gamma-ray detectors 211C and 211E can each include a scintillator crystal positioned adjacent a photodetector with an optical window disposed therebetween. The scintillator crystal, photodetector, and optical window are enclosed within a housing. The housing may contain materials, such as lithium carbonate ($Li_2CO_3$), boron-loaded rubber, or other suitable material, which can substantially shield the corresponding scintillator crystal from thermal neutrons in order to limit the production of thermal neutron capture gamma-rays by the scintillator crystal. The scintillator crystal of the gamma-ray detector can enable detection counts of gamma-rays by producing light when such gamma-rays are captured by the scintillator crystal. Depending on the application, the scintillator crystal may be chosen from a variety of materials as is well known in the art. The photodetector of the gamma-ray detector produces a voltage signal whose magnitude is proportional to the light emitted by the scintillator crystal when gamma-ray radiation is absorbed, once the light has passed through the corresponding optical window. Such voltage signal can be processed to obtain a gamma-ray count rate as is well known.

The instrument housing 203 may also include acquisition and processing electronics 213 comprising a microprocessor system (with associated memory, clock and timing circuitry, and interface circuitry) capable of timing the operation of the neutron source 209, neutron monitor 210, and the radiation detectors of the instrument, storing data from the neutron monitor and radiation detectors, processing the data and storing the results, and coupling any desired portion of the data to the telemetry components for transmission to the surface. The data may also be stored in the instrument housing 203 and retrieved at the surface upon removal of the instrument housing 203 from the wellbore 205.

The instrument housing 203 maybe coupled to an armored electrical cable 215 that may be extended into and retracted from the wellbore 205. The wellbore 205 may or may not include metal pipe or casing therein. The cable 215 conducts electrical power to operate the electrical components of the well logging instrument 201. The cable 215 can also carry electrical signals between the acquisition and processing electronics 213 of the well logging instrument and a surface-located data processing 217.

Note that data processing operations of FIGS. 1A and 1B can be carried out by the acquisition and processing electronics 213 disposed within the instrument housing 203, by the surface-located data processing system 217, or by a combination of the acquisition and processing electronics 213 and the surface-located data processing system 217. The acquisition and processing electronics 213 of the instrument 201 and/or the data processing system 217 may include a one or more digital-signal processors, one or more general purpose processors, and/or one or more computer or computer system as will be explained below with reference to FIG. 3 for analysis of the detected signals as well as devices for recording the signals communicated along the cable 215 from the well logging instrument 201 with respect to depth and/or time.

Figure 3:
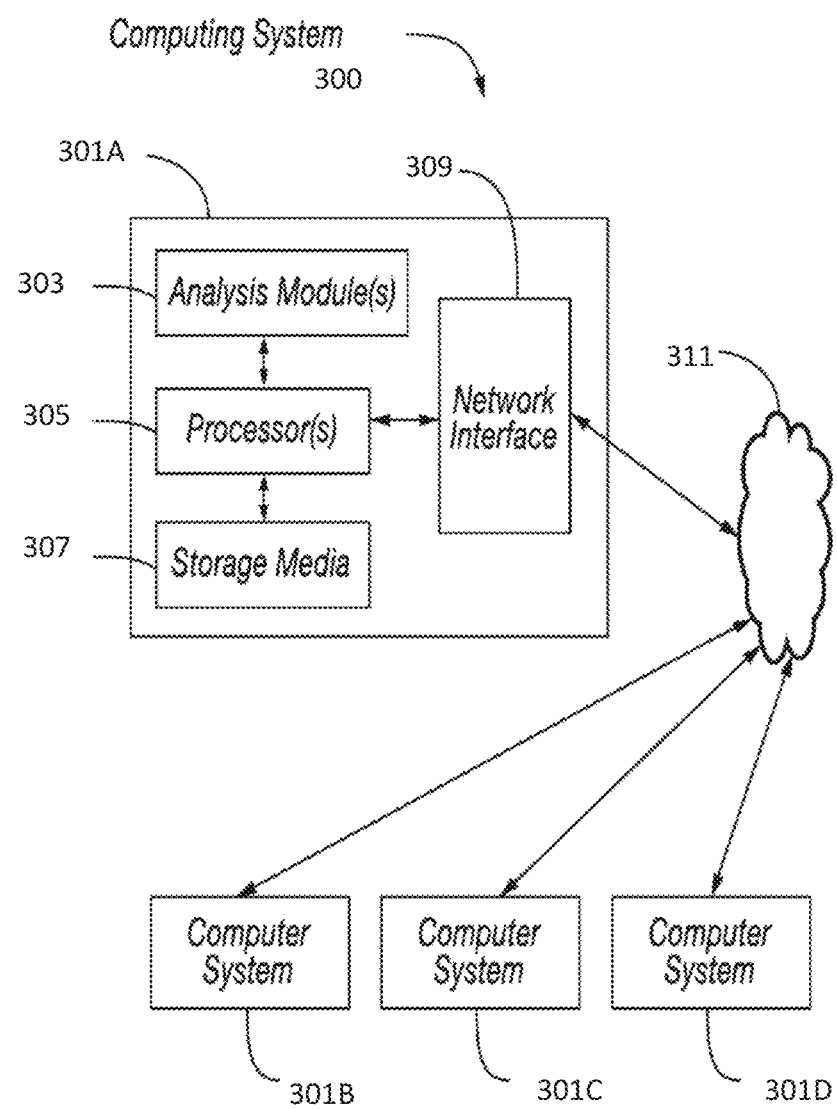
FIG. 3 shows an example computing system in accordance with some embodiments for carrying out the example workflow of FIGS. 1A and 1B.

FIG. 3 shows an example computing system 300 in accordance with some embodiments for carrying out the example workflow such as those to be explained above with reference to FIGS. 1A and 1B. The computing system 300 can be an individual computer system 301A or an arrangement of distributed computer systems. The computer system 301A includes one or more analysis modules 303 (a program of computer-executable instructions and associated data) that can be configured to perform various tasks according to some embodiments, such as the tasks described above. To perform these various tasks, an analysis module 303 executes on one or more processors 305, which is (or are) connected to one or more storage media 307. The processor(s) 305 is (or are) also connected to a network interface 309 to allow the computer system 301A to communicate over a data network 311 with one or more additional computer systems and/or computing systems, such as 301B, 301C, and/or 301D. Note that computer systems 301B, 301C and/or 301D may or may not share the same architecture as computer system 301A, and may be located in different physical locations, e.g. computer systems 301A and 301B may be on a ship underway on the ocean, in a well logging unit disposed proximate a wellbore drilling, while in communication with one or more computer systems such as 301C and/or 301D that are located in one or more data centers on shore, other ships, and/or located in varying countries on different continents. Any one or more of the computer systems may be disposed in the well logging instrument (whether wireline as in FIG. 2 or LWD as in FIG. 4).

The processor 305 can include a microprocessor, microcontroller, processor module or subsystem, programmable integrated circuit, programmable gate array, digital signal processor (DSP), or another control or computing device.

The storage media 307 can be implemented as one or more non-transitory computer-readable or machine-readable storage media. Note that while in the embodiment of FIG. 3, the storage media 307 is depicted as within computer system 301A, in some embodiments, storage media 307 may be distributed within and/or across multiple internal and/or external enclosures of computing system 301A and/or additional computing systems. Storage media 307 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the computer-executable instructions and associated data of the analysis module(s) 303 can be provided on one computer-readable or machine-readable storage medium of the storage media 307, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

It should be appreciated that computing system 300 is only one example of a computing system, and that computing system 300 may have more or fewer components than shown, may combine additional components not depicted in the embodiment of FIG. 3, and/or computing system 300 may have a different configuration or arrangement of the components depicted in FIG. 3. The various components shown in FIG. 3 may be implemented in hardware, software, or a combination of both hardware and software, including one or more signal processing and/or application specific integrated circuits.

Further, the operations of the workflow described above may be implemented by running one or more functional modules in information processing apparatus such as general purpose processors or application specific chips, such as ASICs, FPGAs, PLDs, SOCs, or other appropriate devices. These modules, combinations of these modules, and/or their combination with general hardware are all included within the scope of protection of the invention.

Figure 4:
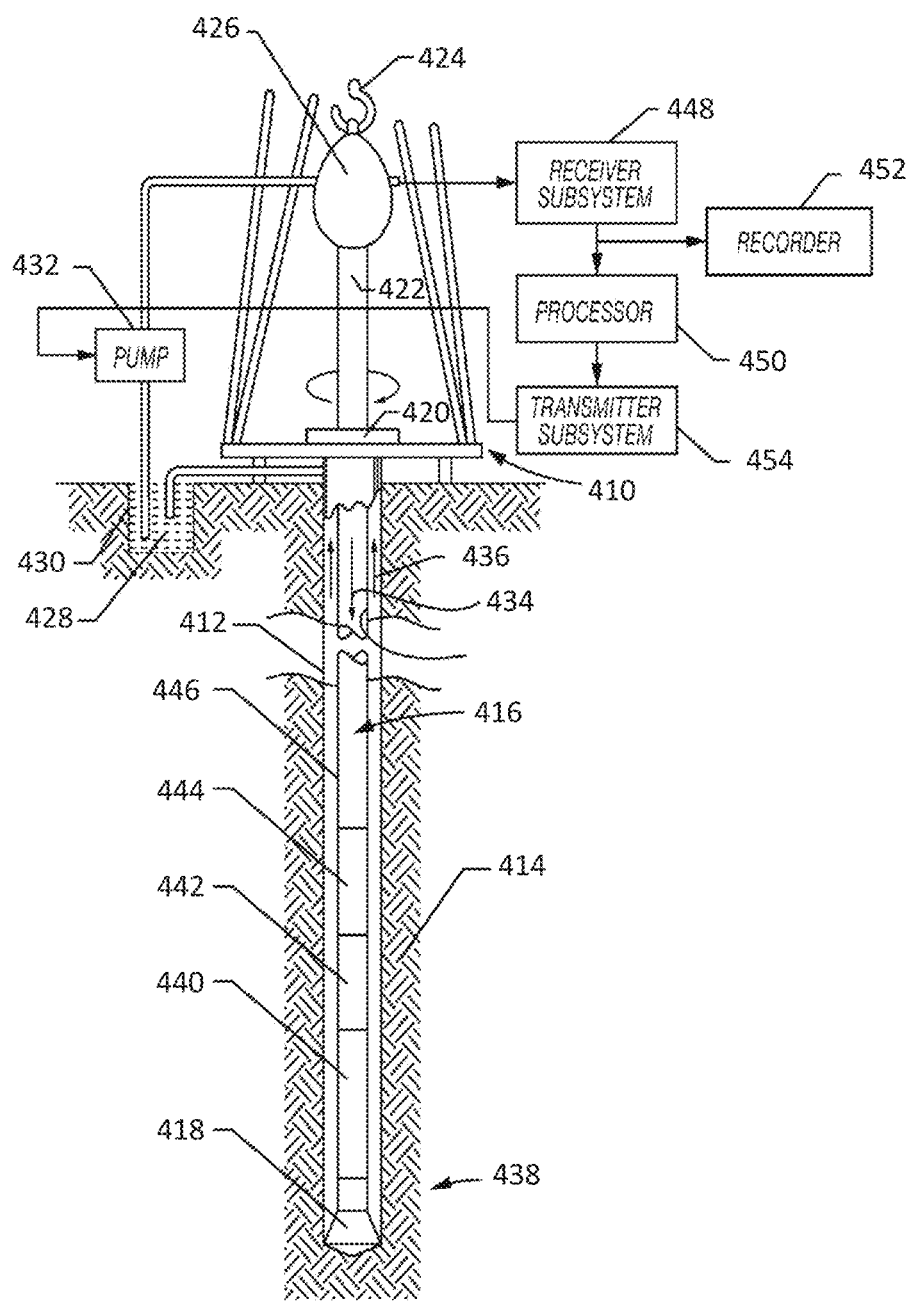
FIG. 4 shows an example logging-while-drilling system that is suitable for carrying out the workflow of FIGS. 1A and 1B.

FIG. 4 shows an example logging-while-drilling system that is suitable for carrying out the workflow of FIGS. 1A and 1B. In this system, a platform and derrick 410 are positioned over a wellbore 412 that may be formed in the geological formation 414 by rotary drilling. A drill string 416 may be suspended within the wellbore 412 and may include a drill bit 418 attached thereto and rotated by a rotary table 420 (energized by means not shown) which engages a kelly 422 at the upper end of the drill string 416. The drill string 416 is typically suspended from a hook 424 attached to a traveling block (not shown). The kelly 422 may be connected to the hook 424 through a rotary swivel 426 which permits rotation of the drill string 416 relative to the hook 424. Alternatively, the drill string 416 and drill bit 418 may be rotated from the surface by a "top drive" type of drilling rig.

Drilling fluid or mud 428 is contained in a mud pit 430 adjacent to the derrick 410. A pump 432 pumps the drilling fluid 428 into the drill string 416 via a port in the swivel 426 to flow downward (as indicated by the flow arrow 434) through the center of the drill string 416. The drilling fluid exits the drill string via ports in the drill bit 418 and then circulates upward in the annular space between the outside of the drill string 416 and the wall of the wellbore 412, as indicated by the flow arrows 436. The drilling fluid 428 thereby lubricates the drill bit 418 and carries formation cuttings to the surface. At the surface, the drilling fluid 428 is returned to the mud pit 428 for recirculation. If desired, a directional drilling assembly (not shown) could also be employed.

A bottom hole assembly ("BHA") 438 may be mounted within the drill string 416, preferably near the drill bit 418. The BHA 438 may include subassemblies for making measurements, processing and storing information and for communicating with surface-located components. Such measurements may correspond to those made using the instrument 201 as explained above with reference to FIG. 2. The BHA 438 is typically located within several drill collar lengths of the drill bit 418. In the illustrated BHA 438, a stabilizer collar section 440 is shown disposed immediately above the drill bit 418, followed in the upward direction by a drill collar section 442, another stabilizer collar section 444 and another drill collar section 446. This arrangement of drill collar sections and stabilizer collar sections is illustrative only, and other arrangements of components in any implementation of the BHA 438 may be used. The need for or desirability of the stabilizer collars will depend on drilling conditions as well as on the demands of the measurement.

In the arrangement shown in FIG. 4, the components of the well logging instrument (including the neutron source, neutron monitor, radiation detectors, and acquisition and processing electronics) may be located in the drill collar section 442 above the stabilizer collar 440. Such components could, if desired, be located closer to or farther from the drill bit 418, such as, for example, in either stabilizer collar section 440 or 444 or the drill collar section 446.

The BHA 438 may also include a telemetry subassembly (not shown) for data and control communication with surface-located components. Such telemetry subassembly may be of any suitable type, e.g., a mud pulse (pressure or acoustic) telemetry system, wired drill pipe, etc., which receives output signals from LWD measuring instruments in the BHA 438) and transmits encoded signals representative of such outputs to the surface where the signals are received and decoded in a receiver subsystem 448, and supplied to a processor 450 and/or a recorder 452. A surface transmitter subsystem 454 may also be provided for establishing downward communication with the BHA 438.

Power for the LWD instrumentation of the BHA 438 may be provided by battery or, as known in the art, by a turbine generator disposed in the BHA 438 and powered by the flow of drilling fluid. The LWD instrumentation may also include directional sensors (not shown separately) that make measurements of the geomagnetic orientation or geodetic orientation of the BHA 438 and the gravitational orientation of the BHA 438, both rotationally and axially.

Note that data processing operations of FIGS. 1A and 1B can be carried out by the acquisition and processing electronics of the BHA 438, by the surface-located data processor 450, or by a combination of the acquisition and processing electronics of the BHA 438 and the surface-located processor 450. The acquisition and processing electronics of the BHA 438 and/or the processor 450 may include a one or more digital-signal processors, one or more general purpose processors, and/or one or more computer or computer system as will be explained below with reference to FIG. 3 for analysis of the detected signals as well as devices for recording the signals communicated from the BHA 438 with respect to depth and/or time.

FIG. 5 shows far gamma-ray detector count rates predicted by an optimized formation parameter that uses a combination of high-energy neutron cross sections for elastic scattering, total neutron absorption, and total gamma-ray production, in addition to bulk density, slowing-down length $L_s$, and hydrogen index. Each of the lines describes the trend of a specific combination of lithology and pore fluid over the full range of formation porosity (0-60 p.u.). LI, SS, DL describe limestone, sandstone, and dolomite lithologies, respectively. Herron shale describes an average sandy-shale composition. FW describes freshwater in the pores, while 200 kppm refers to a brine with 200 kppm NaCl by weight. CH4 refers to methane gas in the pores with the density values as noted. The solid points show the predictions of the optimized formation parameter value along the horizontal axis. The far gamma-ray detector count rate is well predicted from the optimized combination of parameters for a wide variety of formation compositions.

FIG. 6 shows near gamma-ray detector count rates predicted by an optimized formation parameter that uses a combination of high-energy neutron cross sections for elastic scattering, total neutron absorption, and total gamma-ray production, in addition to bulk density, slowing-down length $L_s$, and hydrogen index. Each of the lines describes the trend of a specific combination of lithology and pore fluid over the full range of formation porosity (0-60 p.u.). LI, SS, DL describe limestone, sandstone, and dolomite lithologies, respectively. Herron shale describes an average sandy-shale composition. FW describes freshwater in the pores, while 200 kppm refers to a brine with 200 kppm NaCl by weight. CH4 refers to methane gas in the pores with the density values as noted. The solid points show the predictions of the optimized formation parameter value along the horizontal axis. The near gamma-ray detector count rate is well predicted from the optimized combination of parameters for a wide variety of formation compositions.

FIG. 7 shows the near epithermal neutron detector count rates with respect to an optimized formation parameter that uses a combination of slowing-down length $L_s$, thermal diffusion length $L_d$, bulk density, and hydrogen index. Each of the lines describes the trend of a specific combination of lithology and pore fluid over the full range of formation porosity (0-60 p.u.). LI, SS, DL describe limestone, sandstone, and dolomite lithologies, respectively. Herron shale describes an average sandy-shale composition. FW describes freshwater in the pores, while 200 kppm refers to a brine with 200 kppm NaCl by weight. CH4 refers to methane gas in the pores with the density values as noted.

The solid points show the predictions of the optimized formation parameter value along the horizontal axis. The near epithermal neutron detector count rate is generally well predicted from the optimized combination of parameters for a wide variety of formation compositions.

FIG. 8 shows macroscopic cross section data for elastic scattering of neutrons in various common minerals and fluid components in the high-energy neutron regime. The legend notes the pure mineral or fluid whose macroscopic cross section is plotted in each curve. Note that the vertical axis (cross section data) is plotted on a logarithmic scale.

FIG. 9 shows an example of a Flux Sensitivity Function (FSF) for an inelastic gamma-ray count rate.

FIG. 10 shows an example of the relative fractions of formation signal and tool background with respect to bulk density for different geological formations, as modeled for inelastic gamma-ray counts at a far gamma-ray detector. The fractions are plotted for specific combinations of lithology and pore fluid over the full range of formation porosity (0-60 p.u.). LI, SS, DL describe limestone, sandstone, and dolomite lithologies, respectively. Herron shale describes an average sandy-shale composition. FW describes freshwater in the pores, while CH4 refers to methane gas in the pores with gas density 0.001 g/cc. The solid lines show the relative fraction of gamma rays contributed by the formation signal, while the dashed lines show the relative fraction of gamma rays contributed by the tool background.

FIG. 11 shows an example of the absolute contributions (count rates) of formation signal, tool background, and borehole background with respect to bulk density for different geological formations, as modeled for inelastic gamma-ray counts at a far gamma-ray detector. The absolute count rates are plotted for specific combinations of lithology and pore fluid over the full range of formation porosity (0-60 p.u.). LI, SS, DL describe limestone, sandstone, and dolomite lithologies, respectively. Herron shale describes an average sandy-shale composition. FW describes freshwater in the pores, while CH4 refers to methane gas in the pores with gas density 0.001 g/cc. The solid lines show the count rate of gamma rays contributed by the formation signal, the dashed lines show the count rate of gamma rays contributed by the tool background, and the dotted lines show the count rate of gamma rays contributed by the borehole background.

As used in the description and claims, phrases in the form of "at least one of [a] and [b]" should be construed as being disjunctive. For example, the recitation of "at least one of [a], [b], and [c]" should be understood to encompass: arrangements that include [a] but neither [b] nor [c]; arrangements that include [b] but neither [a] nor [c]; arrangements that include [c] but neither [a] nor [b]; arrangements that include [a] and [b] but not [c]; arrangements that include [a] and [c] but not [b]; arrangements that include [b] and [c] but not [a]; and arrangements that include [a], [b], and [c]. There have been described and illustrated herein several embodiments of a method and system that employs forward models for radiation detectors of a downhole neutron tool to measure bulk density (and possibly other formation parameters) of a geological formation.

While particular embodiments have been described, it is not intended that the claims and invention as set forth herein be limited thereto, as it is intended that the claim and invention be as broad in scope as the art will allow and that the specification be read likewise. It will therefore be appreciated by those skilled in the art that yet other modifications could be made to the provided embodiments without deviating from its spirit and scope as claimed.

What is claimed is:

1. A method for determining at least one property of a geological formation, comprising:
   using at least one forward model to derive from at least one property of the geological formation at least one synthetic detector measurement that relates to at least one of (a) neutron-induced gamma-ray emission from the geological formation and (b) direct measurement of neutrons from the geological formation;
   taking at least one actual detector measurement of at least one of (a) neutron-induced gamma-ray emission from the geological formation and (b) neutrons from the formation; and
   using the at least one synthetic detector measurement in an inversion procedure combined with corresponding at least one actual detector measurement to infer at least one property of the geological formation including bulk density of the geological formation.

2. The method according to claim 1, wherein:
   the neutron-induced gamma-ray emission results from inelastic interaction of neutrons with the geological formation.

3. The method according to claim 1, further comprising:
   emitting neutrons into the geological formation in order to induce gamma-ray emission from the geological formation.

4. The method according to claim 1, wherein the using the at least one synthetic detector measurement comprises
   comparing the at least one synthetic detector measurement to a corresponding at least one actual detector measurement in order to infer the at least one property of the geological formation.

5. The method according to claim 4, further comprising:
   tuning the at least one forward model based on one or more iterations of an inversion process that matches one or more synthetic detector measurements with corresponding one or more actual detector measurements; and
   using the at least one forward model that results from the tuning to infer the at least one property of the geological formation.

6. The method according to claim 1, further comprising:
   storing the at least one property of the geological formation in computer memory for subsequent analysis.

7. The method according to claim 1, further comprising:
   controlling drilling of a well in the geological formation based on the at least one property of the geological formation.

8. The method according to claim 1, wherein:
   the forward model includes a formation parameter defined by a linear or non-linear combination of properties of the geological formation.

9. The method according to claim 8, wherein:
   the formation parameter is converted to a synthetic detector measurement by a calibration function.

10. The method according to claim 9, wherein:
    the calibration function for the synthetic detector measurement (SDM) is a quadratic polynomial equation of the form $$\log(SDM) = a \cdot F_p^2 + b \cdot F_p + c,$$

where $F_p$ is the formation parameter and a, b, and c are polynomial coefficients.

11. The method according to claim 1, wherein:
    a plurality of forward models is used to derive a corresponding plurality of different synthetic detector measurements that relate to at least one of (a) neutron-induced gamma-ray emission from the geological formation and (b) direct measurement of neutrons from the geological formation; and using the plurality of different synthetic detector measurements to infer the at least one property of the geological formation including bulk density of the geological formation.

12. The method according to claim 11, wherein:
the plurality of forward models corresponds to different radiation detector measurements.

13. The method according to claim 12, wherein:
the plurality of forward models includes a forward model for a near gamma-ray detector measurement that represents a count rate for neutron-induced gamma-rays detected by a near gamma-ray detector; and
the plurality of forward models includes a forward model for a far gamma-ray detector measurement that represents a count rate for neutron-induced gamma-rays that are detected by a far gamma-ray detector.

14. The method according to claim 12, wherein:
the plurality of forward models includes a forward model for an epithermal neutron detector measurement that represents a count rate for epithermal neutrons that are detected by an epithermal neutron detector.

15. The method according to claim 1, wherein:
the at least one property of the geological formation used in the forward model is selected from the group consisting of:
bulk density of the geological formation,
electron density of the geological formation,
hydrogen index of the geological formation,
a slowing-down length $L_s$ of the geological formation,
a thermal diffusion length $L_d$ of the geological formation,
a neutron migration length $L_m$ of the geological formation,
a fast slowing down length $L_f$ of the geological formation,
porosity of the geological formation,
water salinity of the geological formation,
oil saturation of the geological formation,
gas saturation of the geological formation,
rock (matrix) bulk density of the geological formation,
pore fluid bulk density of the geological formation, and
at least one cross-section for particle interaction in the geological formation.

16. The method according to claim 1, wherein:
the at least one forward model includes at least one average cross-section evaluated over a range of neutron source energy levels.

17. The method according to claim 1, wherein:
the at least one forward model is configured to account for spatial sensitivity of a respective radiation detector measurement.

18. The method according to claim 1, wherein:
the at least one forward model is based on a flux sensitivity function (FSF) for a respective radiation detector measurement.

19. The method according to claim 1, wherein:
the at least one forward model is configured to account for potential variation in a respective radiation detector measurement, wherein the potential variation is selected from the group including variation in formation signal, variation in tool background signal, variation in the borehole geometry and environment, variation in the operation of the downhole tool, and other possible variation.

20. A system for determining at least one property of a geological formation, comprising:
a downhole tool configured to be positioned in a borehole in the geological formation having at least one radiation detector configured for taking at least an actual detector measurement measuring at least one of (a) neutron-induced gamma-ray emission from the geological formation and (b) neutrons from the formation; and
a data processor configured to
store at least one forward model, wherein the at least one forward model is used to derive from at least one property of the geological formation at least one synthetic detector measurement that relates to at least one of (a) neutron-induced gamma-ray emission from the geological formation and (b) direct measurement of neutrons from the geological formation, and to
infer at least one property of the geological formation including bulk density of the geological formation using the at least one synthetic detector measurement in an inversion procedure combined with corresponding at least one actual detector measurement.

21. The system according to claim 20, wherein:
the neutron-induced gamma-ray emission results from inelastic interaction of neutrons with the geological formation.

22. The system according to claim 20, wherein the downhole tool comprises a neutron source, wherein the neutron source is configured to emit neutrons into the geological formation to produce inelastic neutron interaction in the geological formation.

23. The system according to claim 22, wherein:
the data processor is further configured to derive at least one actual detector measurement that relates to neutron-induced gamma-ray emission from the geological formation; and
the data processor is further configured to compare one or more synthetic detector measurements to corresponding one or more actual detector measurements in order to infer the at least one property of the geological formation.

24. The system according to claim 22, wherein:
the downhole tool comprises one of a wireline tool and a logging-while-drilling tool.

* * * * *